(12) United States Patent
Everhart et al.

(10) Patent No.: US 6,845,251 B2
(45) Date of Patent: Jan. 18, 2005

(54) ADVANCED VOICE RECOGNITION PHONE INTERFACE FOR IN-VEHICLE SPEECH RECOGNITION APPLICATIONS

(75) Inventors: Charles A. Everhart, Canton, MI (US); Diane V. Gourd, Dearborn, MI (US); Rajeev M. Joshi, Canton, MI (US); John Kefalos, Westland, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 687 days.

(21) Appl. No.: 09/727,339

(22) Filed: Nov. 29, 2000

(65) Prior Publication Data

US 2002/0065661 A1 May 30, 2002

(51) Int. Cl.[7] .................................................. H04Q 7/32
(52) U.S. Cl. ..................................... 455/563; 455/569.1
(58) Field of Search .............................. 455/563, 414.1, 455/414.2, 414.3, 414.4, 422.1, 569.1, 569.2; 379/388.04; 704/201, 270, 251, 255, 257

(56) References Cited

U.S. PATENT DOCUMENTS

| | | | |
|---|---|---|---|
| 5,222,121 A | 6/1993 | Shimada | |
| 5,297,183 A | * 3/1994 | Bareis et al. | ............ 455/563 X |
| 5,301,227 A | 4/1994 | Kamei et al. | |
| 5,584,052 A | 12/1996 | Gulau et al. | |
| 5,719,921 A | 2/1998 | Vysotsky et al. | |
| 5,805,672 A | 9/1998 | Barkat et al. | |
| 5,852,804 A | 12/1998 | Sako | |
| 5,912,949 A | 6/1999 | Chan et al. | |
| 5,915,239 A | 6/1999 | Haavisto et al. | |

* cited by examiner

Primary Examiner—Nay Maung
Assistant Examiner—Philip J. Sobutka
(74) Attorney, Agent, or Firm—Brinks Hofer Gilson & Lione

(57) ABSTRACT

A method for controlling a phone system having speech recognition capabilities is disclosed. The method includes entering a phone number into a phone system using a first voice command, dialing the phone number using a second voice command, associating the phone number with a tag using a third voice command, and storing the tag into the phone directory using a fourth voice command. The phone system of the present invention repeats the voice commands after the system receives each of the commands from a user.

20 Claims, 14 Drawing Sheets

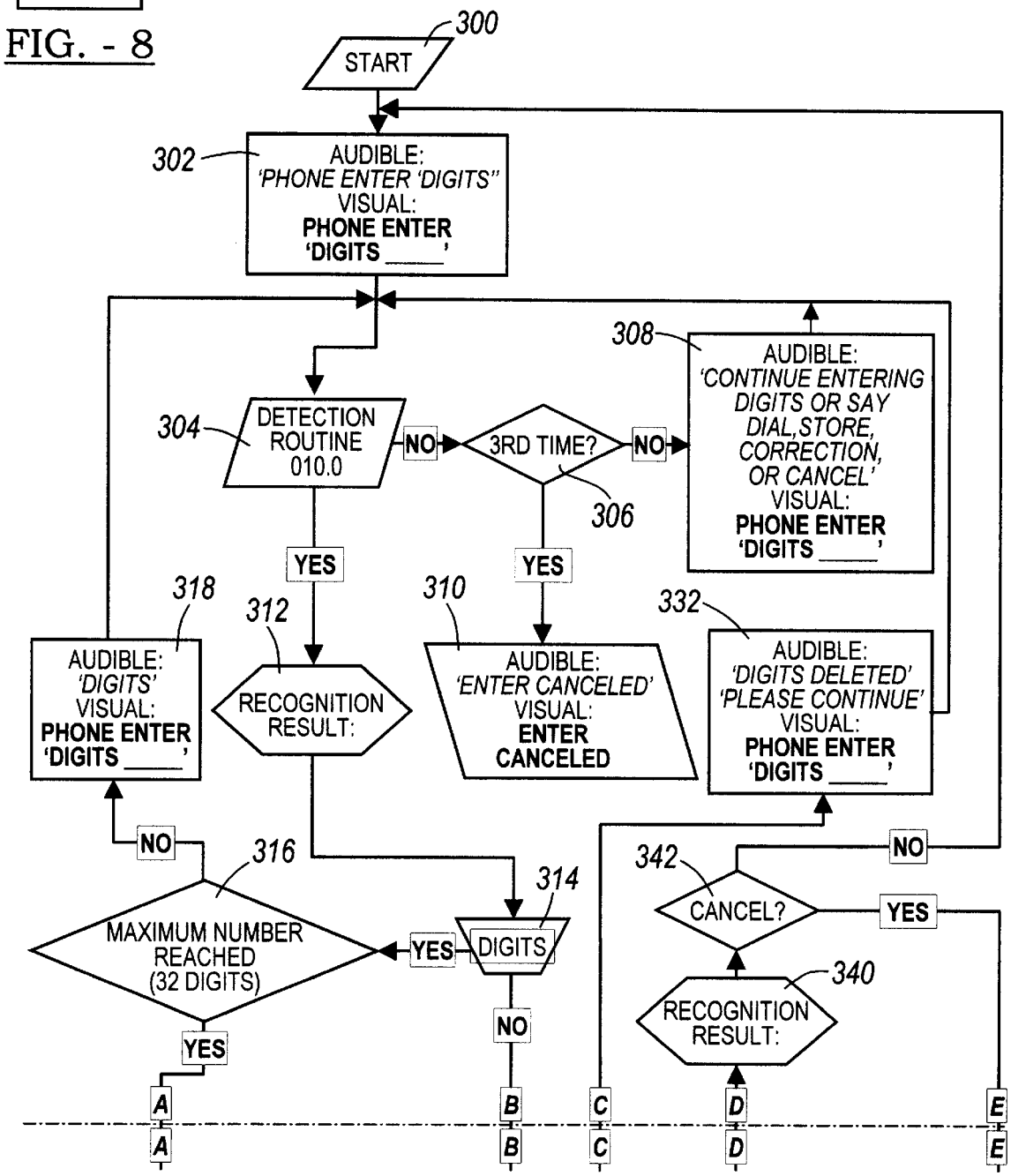

ADVANCED VOICE RECOGNITION PHONE INTERFACE FOR IN-VEHICLE SPEECH RECOGNITION APPLICATIONS

TECHNICAL FIELD OF THE INVENTION

The present invention generally relates to systems and methods for operating a phone using a voice recognition interface.

BACKGROUND

The use of voice recognition technology to control various electronic devices is widespread. One of the earliest applications of voice recognition technology was in the control of videocassette recorders and televisions.

Further, other devices such as phones may also be controlled using voice recognition technology. For example, telephones in-vehicles have been interfaced with voice recognition software to allow the vehicle operators "hands free" manipulation of the telephone, especially while the vehicle is in motion. Thus, the vehicle operator has their hands available to safely operate the vehicle.

Conventionally, speech recognition systems in automobiles allow a vehicle operator to dial a phone number and conduct other phone operations through voice commands. While these conventional systems have provided a basic means by which a vehicle operator can control a phone, these systems are known to have limited capability and are difficult to operate.

Therefore, what is needed is an improved voice recognition phone interface for operating a phone in a vehicle. The improved interface must be easy to use by first time users and have a capability to be manipulated efficiently by more experienced users.

SUMMARY OF THE INVENTION

In accordance with an aspect of the present invention a method for controlling a phone system having speech recognition capabilities is provided. The method includes entering a phone number into a phone system using a first voice command, dialing the phone number using a second voice command, associating the phone number with a tag using a third voice command, and storing the tag into the phone directory using a fourth voice command. The phone system of the present invention repeats the voice commands after the system receives each of the commands from a user.

In accordance with another aspect of the present invention, entering the phone number includes articulating a memory number associated with the phone number.

In accordance with another aspect of the present invention, entering the phone number further includes articulating a tag associated with the phone number.

In accordance with yet another aspect of the present invention, a computer readable storage medium having instructions stored thereon that are executable by a controller to perform a method of controlling a phone system having speech recognition capabilities is provided. The controller is in communication with a phone system actuator, a microphone, a speaker and a phone. The medium further has instructions for entering a phone number into a phone system using a first voice command, instructions for dialing the phone number using a second voice command, instructions for associating the phone number with a tag using a third voice command, and instructions for storing the tag into the phone directory using a fourth voice command. The phone system repeats the voice commands after the system receives each of the commands ensuring that the system user is aware of what the phone system has recognized.

Further objects, features and advantages of the invention will become apparent from consideration of the following description and the appended claims when taken in connection with the accompanying drawings.

DETAILED DESCRIPTION OF THE PREFERRED EMBODIMENT

Figure 1:
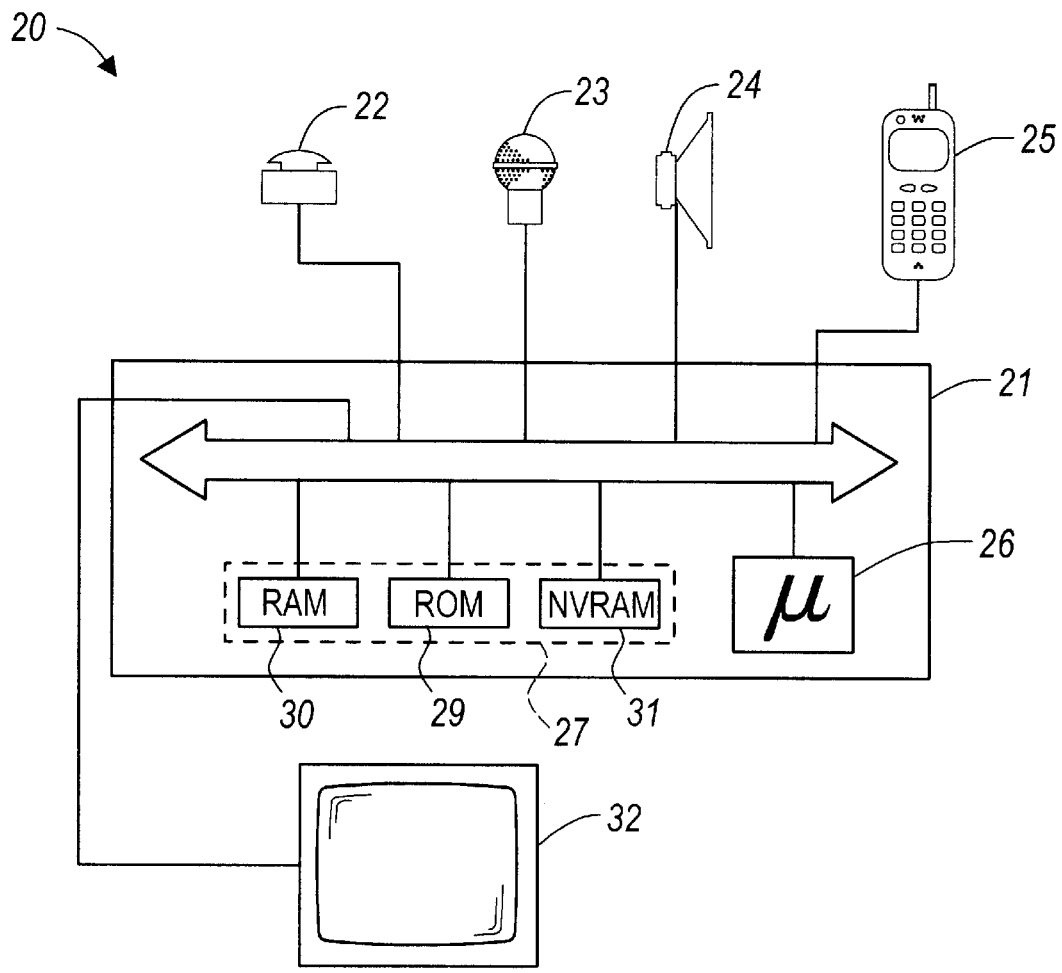
FIG. 1 is a schematic diagram of a phone system that utilizes voice recognition technology to operate a phone in a vehicle, in accordance with the present invention.

Shown in FIG. 1 is a schematic diagram of a voice recognition phone system 20 for an in-vehicle speech recognition system. Phone system 20 of the present invention preferably, includes a controller 21 in communication with a phone system actuator 22, a microphone 23, a speaker 24 and an in-vehicle phone 25. Preferably, a display screen 32 in communication with controller 21 is also provided for rendering text messages. Audible messages issued by the phone system, as will be described in further detail below, may also be displayed as text on screen 32. The text messages are displayed during the entire system operation to provide the system user with a continuous reminder of what the system has recognized and is expecting from the user. The present invention contemplates providing the user with an option to turn off audible system messages and only display system messages on the screen.

Controller 21 preferably includes a microprocessor 26 in communication with various computer readable storage media 27 via data and control bus 28. Computer readable storage media 27 may include any of a number of known devices which function as read only memory 29, random access memory 30, and non-volatile random access memory 31.

Computer readable storage media 27 have instructions stored thereon that are executable by controller 21 to perform methods of controlling the operation of in-vehicle phone 25 using voice recognition processing. The program instructions direct controller 22 to control the features of the phone system, with the instructions being executed by microprocessor 26.

As is appreciated by one of ordinary skill in the art, control logic may be implemented in hardware, firmware, software, or combinations thereof. Further, although in a preferred embodiment, controller 22 includes microprocessor 26, any of a number of known programming and processing techniques or strategy may be used to control the phone system, in accordance with the present invention.

Phone system 20 may be actuated using a variety of means. For example, the phone system may be actuated using an audible command or by depressing the phone system actuator 22 and then expressing an audible command. The phone system of the present invention allows a vehicle operator to verbalize commands to actuate various functions of an in-vehicle phone system.

Once the actuator 22 is depressed the system user may articulate an audible command. The command is received by microphone 23 and communicated to microprocessor 21 for analysis. If the command is recognizable microprocessor may broadcast a message using speaker 24 and/or operate in-vehicle phone 25. Phone interface software that runs on microprocessor 21 for controlling the particular operation of phone system 20 will be described in detail below.

Figure 2:
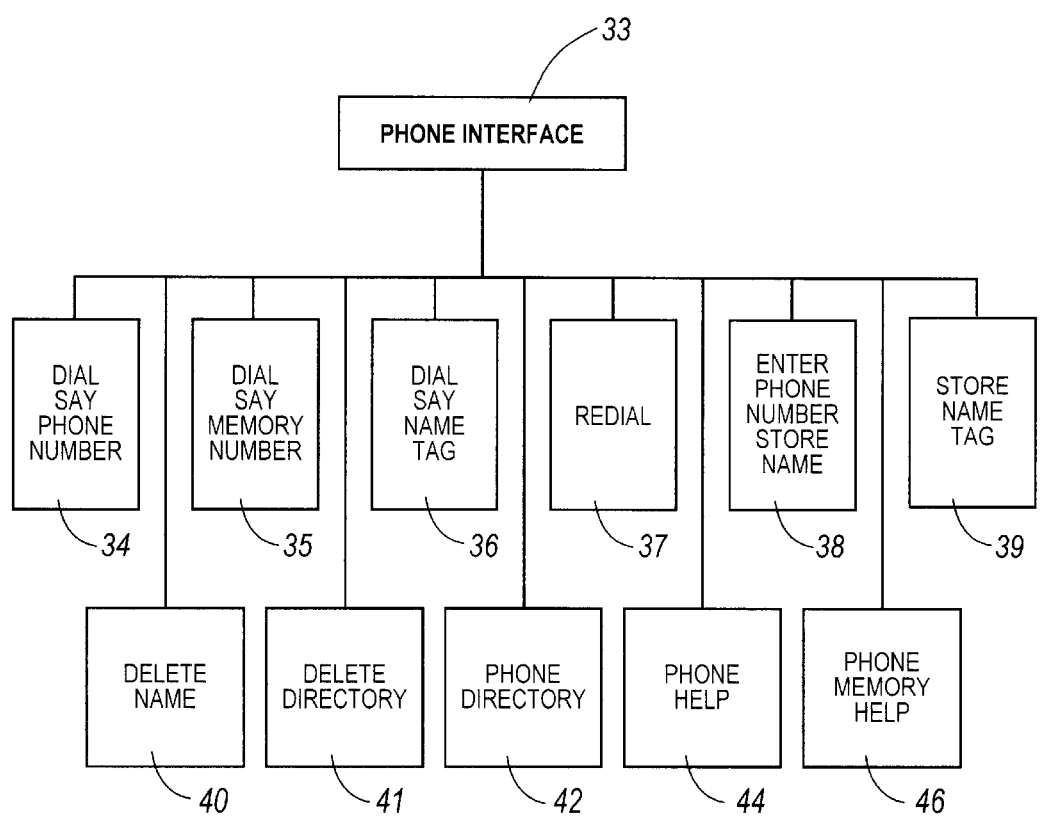
FIG. 2 is a schematic diagram of a phone interface having various features and functions for operating a phone in a vehicle, in accordance with the present invention.

Phone interface software 33 has a plurality of phone functions or features, as shown in FIG. 2. These functions which will be described further below include: a dial phone number function 34, a dial memory number function 35, a dial name function 36, a redial function 37, and enter phone number and store function 38, an enter tag or nametag function 39, a delete tag or nametag function 40, a delete directory function 41, an access phone directory function 42, a phone help function 44, and a phone memory help function 46. The aforementioned functions provide a method by which an in-vehicle phone may be operated in an easily learnable and intuitive manner by both beginner and experienced users. Moreover, the system and method of the present invention allows experienced users to quickly navigate through the system to accomplish tasks in an efficient manner.

Figure 3:
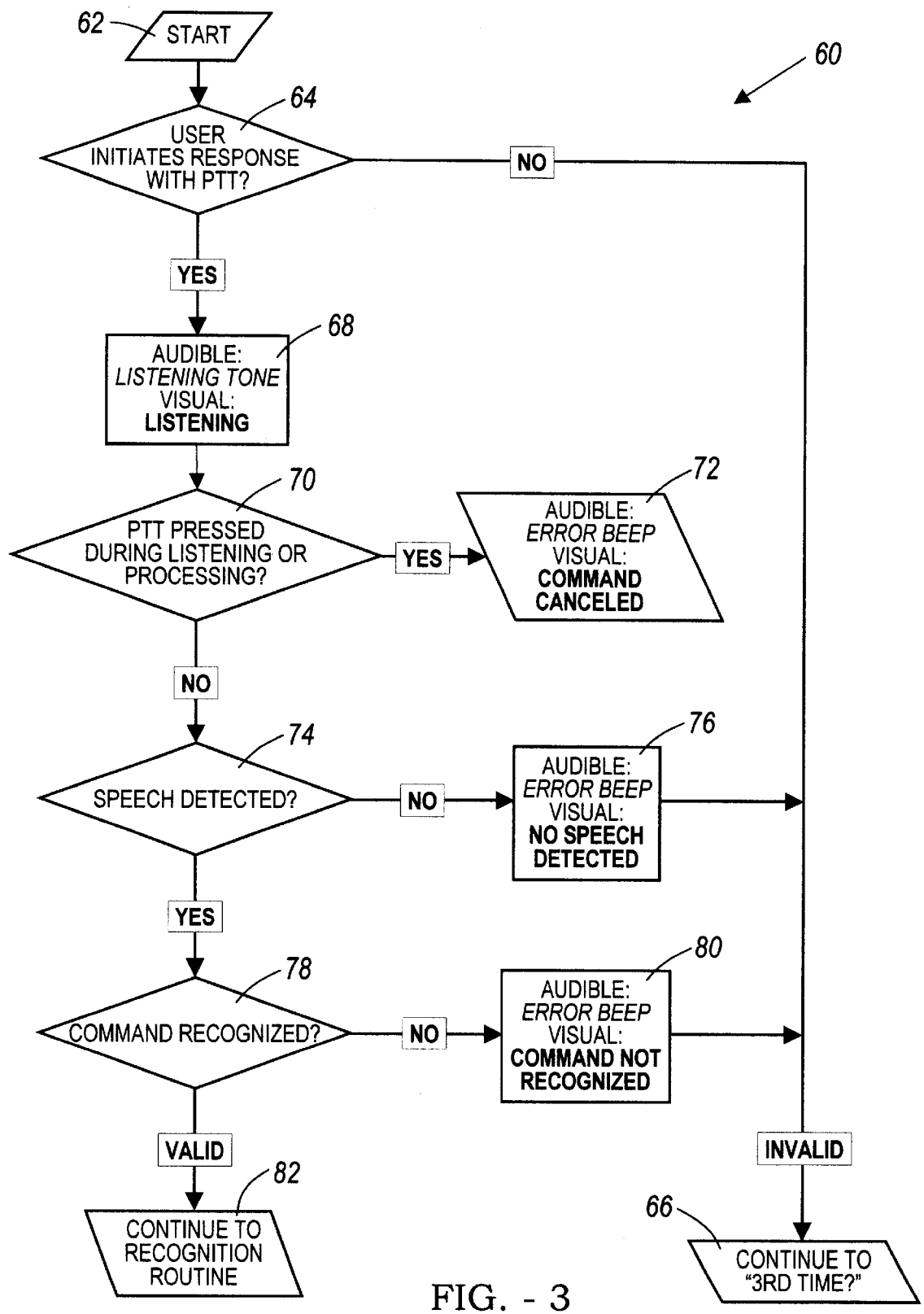
FIG. 3 is a flow diagram of a phone interface detection routine, in accordance with the present invention.

Referring now to FIG. 3, a phone interface detection routine 60 is illustrated, in accordance with the present invention. The detection routine is initiated when the phone interface 24 is expecting to receive an audible input by a user, as represented by block 62. At block 64 the phone interface 24 determines whether a user has depressed the phone interface actuator 22. If the user has depressed the phone interface actuator 22, the method continues at block 68 wherein the system provides an audible "beep" indicating that the system is listening for the user's verbal command. At block 70, the system determines whether the user has actuated the phone interface actuator. If the user has actuated the phone interface actuator, the system responds with an "error beep" indicating that the command has been cancelled, as represented by block 72. However, if the user has not depressed the phone interface actuator, the system determines whether the user has communicated a audible command, as represented by block 74. If the system determines that the user has not articulated a verbal command, then the system responds with an audible "error beep", as represented by block 76. However, if the system determines that a user has issued a verbal command then the system determines if the command is recognizable, as represented by block 78. If the command is not recognizable the system issues an audible error beep, as represented by block 80. At block 82, the system has determined that the command is recognizable and continues to a recognition routine as will be described in greater detail below. The detection routine, as will become clear by the following text, is called by the various phone functions to determine whether the user has expressed a verbal command and whether that verbal command is recognizable by the phone interface 24. The present invention contemplates issuing an audible error message instead of an "error beep" or in addition to the "error beep" to alert the system user of the system problem.

Whenever possible the present invention contemplates responding to the user with the actual name, tag, phone number, and digits that the user has articulated in a command or response. Accordingly, it is understood that references, made throughout this specification, to the above stated user commands or responses would be the actual words or numbers articulated by the system user.

Figure 4:
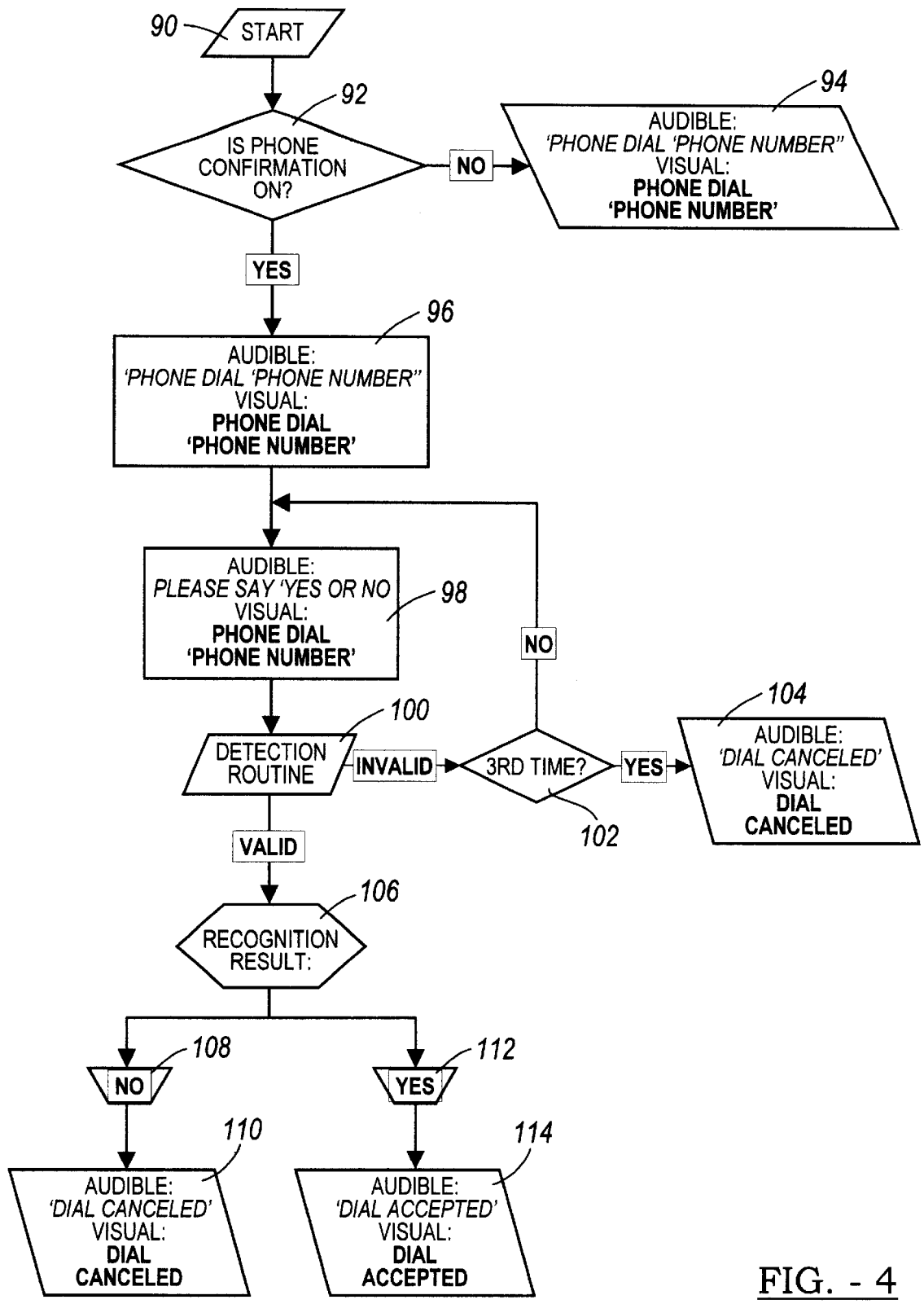
FIG. 4 is a flow diagram illustrating a method for entering a phone number into a phone using a speech recognition technology, in accordance with the present invention.

Referring now to FIG. 4, a method for dialing a phone number using voice commands is illustrated, in accordance with the present invention. This method is a function of the phone interface of the present invention and is initiated at block 90. At block 92 the system of the present invention determines whether a phone confirmation feature has been activated. The phone confirmation feature is an option where the system confirms the phone number to be dialed with the user before the number is actually dialed. If this option is not pre-selected then the system repeats the phone number to be dialed and then dials the number, as represented by block 94. However, if the phone confirmation option is "on" (pre-selected) then the system repeats the phone number to be dialed, at block 96 and then asks whether this phone number is correct by requesting the user to say "yes" or "no", as represented by block 98. At block 100, the system runs the detection routine to determine whether the user has verbally responded. If the detection routine determines that the user has not responded and it is not the third time the detection routine has tried to determine whether the user has responded the system returns to block 98 and asks the user to say "yes" or "no", as represented by block 102. However, if the detection routine has tried a third time to detect a response from the user and no recognizable response has been received the system responds with a "dial cancelled" message, as represented by block 102 and 104. Of course, the present invention contemplates that the number of times the system will ask the user to response before canceling may be changed to some other reasonable number. Additionally, the present invention contemplates that the system will accept/recognize different words, spoken by the user, that have the same meaning as a particular response, for example the user may respond by saying "affirmative" instead of "yes" and "negative" instead of saying "no".

If, on the other hand, the detection routine has determined that the user has responded with a recognizable audible command then a recognition result is achieved, as represented by block 106. If the system determines that the user has responded negatively, then the system responds with a "dial cancelled" message, as represented by blocks 108 and 110. However, if the system determines that the user has responded affirmatively then the system issues a "dial accepted" message, as represented by blocks 112 and 114.

Figure 5:
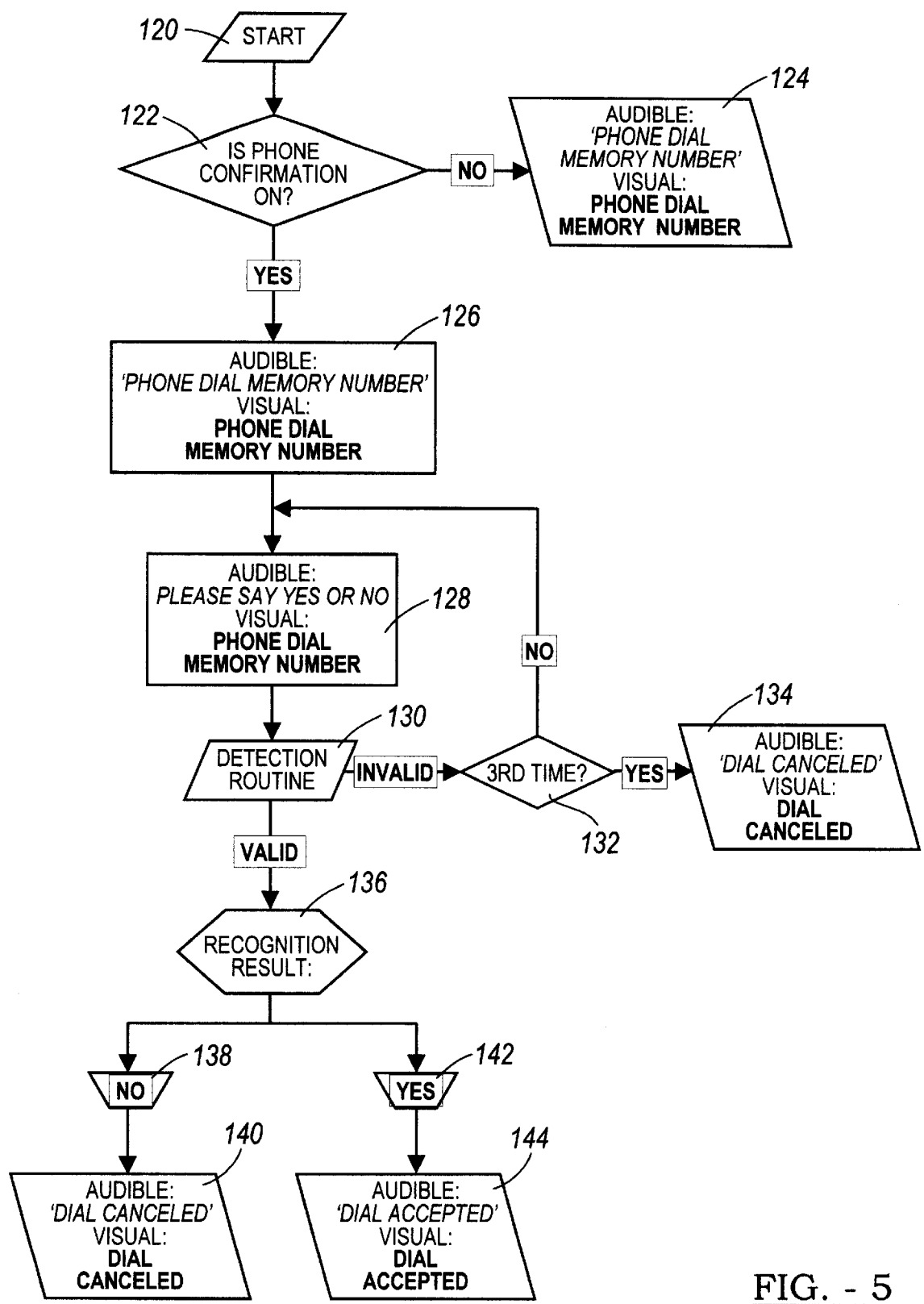
FIG. 5 is a flow diagram illustrating a method for dialing a phone number using a memory number and speech recognition technology, in accordance with the present invention.

Referring now to FIG. 5, a method for dialing a phone using a "memory number" is illustrated, in accordance with the present invention. Another feature of the phone interface of the present invention provides a user the capability to dial a phone number by merely saying a memory number (a number associated with a memory space in a phone directory, wherein the memory space is occupied by a phone number). The phone dialing by memory number routine is initiated, at block 120, where the system has determined that the user wants to dial a phone number by merely saying a "memory number". As represented by block 122, the system determines whether the confirmation feature, as previously described, has been activated. If the confirmation feature has not been activated then the system responds with the message "phone dial memory number" wherein the memory number is the number that the user has just verbally expressed, the phone then is immediately dialed, as represented by block 124. However, if the confirmation feature has been activated the system responds with the message "phone dial memory" and the number the user said, and then further issues with the message "please say 'yes'" or "'no'", as represented by blocks 126 and 128. At block 130, the detection routine determines whether the user has responded to the system messages. If the user has not responded to the system messages, the system asks the user again to respond "yes" or "no", as indicated by blocks 132 and 128. If the system determines that the user has not responded after the system has asked for a response for a third time the system responds with the message "dial cancelled", as indicated by blocks 132 and 134. However, if the system determines that the user has responded with a recognizable command then a recognition result is determined, at block 136. If the system determines that the user does not want to dial the phone number at the memory location stated, the system responds with the message "dial cancelled", as represented by blocks 138 and 140. If however, the system determines that the user has responded affirmatively, the system responds with the message "dial accepted" and then the phone is dialed, as represented by blocks 142 and 144.

Figure 6:
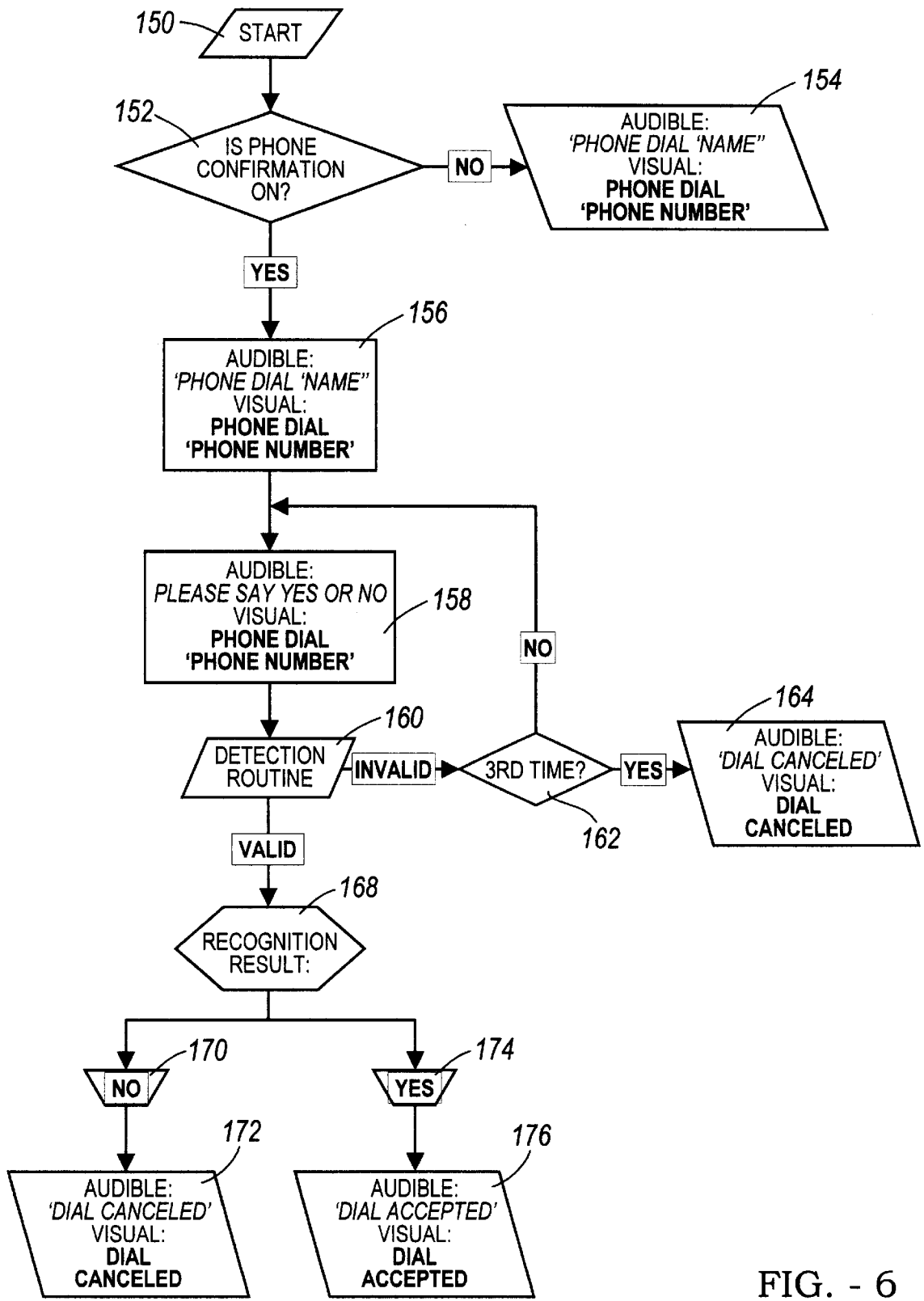
FIG. 6 is a flow diagram illustrating a method for dialing phone using a nametag, in accordance with the present invention.

Referring now to FIG. 6, a phone dial by "name" routine is illustrated, in accordance with the present invention. The phone dial name routine is initiated at block 150, where the system has determined that a user has actuated the phone interface actuator and has issued the command "phone dial" followed by a recognizable "name" in the phone directory. At block 152 the system determines whether the phone confirmation feature has been activated. If the phone confirmation feature has not been activated then the system responds with the message "phone dial" and the name spoken by the user, as represented by blocks. 152 and 154. The phone number associated with the name is then immediately dialed. If, however, the phone confirmation feature has been activated the system responds by stating "phone dial" then the name declared by the user, as represented by blocks 152 and 156. At block 158, the system asks the user to respond with a "yes" or a "no".

The detection routine is initiated, at block 160, to determine if and how the user has responded. If the detection routine determines that the user has not responded then the system determines whether it is the third time there has been no recognizable response, as represented by block 162. If it is the third time that there has been no response from the user, the system issues the message "dial cancelled", as represented by block 164. However, if it is not the third time the system has asked the user to respond, the system asks the user to respond again, as represented by blocks 162 and 158.

When the detection routine determines that a user has responded in a recognizable manner a recognition result is determined, as represented by block 168. If the system determines that the user has responded negatively the system issues the message "dial cancelled", as represented by blocks 170 and 172. On the other hand, if the system has determined that the user has responded affirmatively the system issues the message "dial accepted", as represented by blocks 174 and 176.

Figure 7:
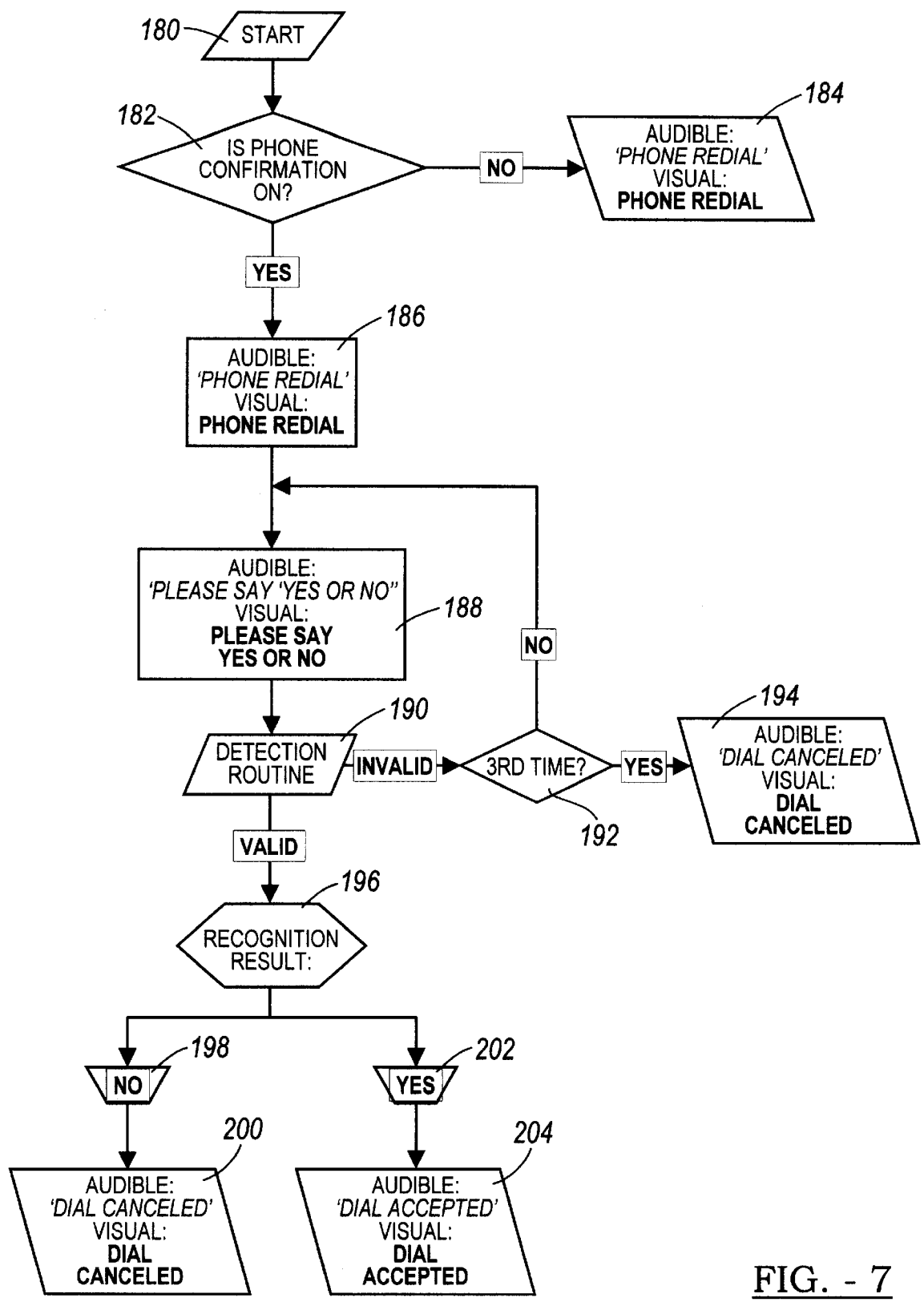
FIG. 7 is a flow chart illustrating a method for redialing a phone using a verbal command, in accordance with the present invention.

Referring now to FIG. 7, a phone redial routine is illustrated, in accordance with the present invention. The phone redial routine of FIG. 6 is yet another feature of the phone interface of the present invention. The phone redial routine is initiated at block 180, where the system has determined that the user has pushed the phone interface actuator and has issued the command "phone redial". At block 182, the system determines whether the phone confirmation feature has been activated. If the phone confirmation feature has not been activated then the system responds by issuing the message "phone redial", as represented by block 184. The system then redials the phone number. If, however, the phone confirmation feature has been activated then the system responds with the message "phone redial" and requests the user to say "yes" or "no", as represented by blocks 186 and 188. At block 190, the system runs the detection routine to determine whether the user has responded in a recognizable manner. If the user has not responded in a recognizable manner the system requests the user to respond "yes" or "no" again, as indicated at block 192. Further, as indicated by block 192, the system determines whether the user has not responded in a recognizable manner for a third time. If the user has not responded after a third time the system issues the message "dial cancelled" as represented by blocks 192 and 194. However, if the detection routine determines that the user has responded in a recognizable manner a recognition result is determined, at block 196. If the system has determined that the user has responded negatively then the system issues the message "dial cancelled", as represented by blocks 198 and 200. Alternatively, if the system has determined that the user has responded affirmatively, the system issues the message "dial accepted", as represented by blocks 202 and 204.

Figure 8B:
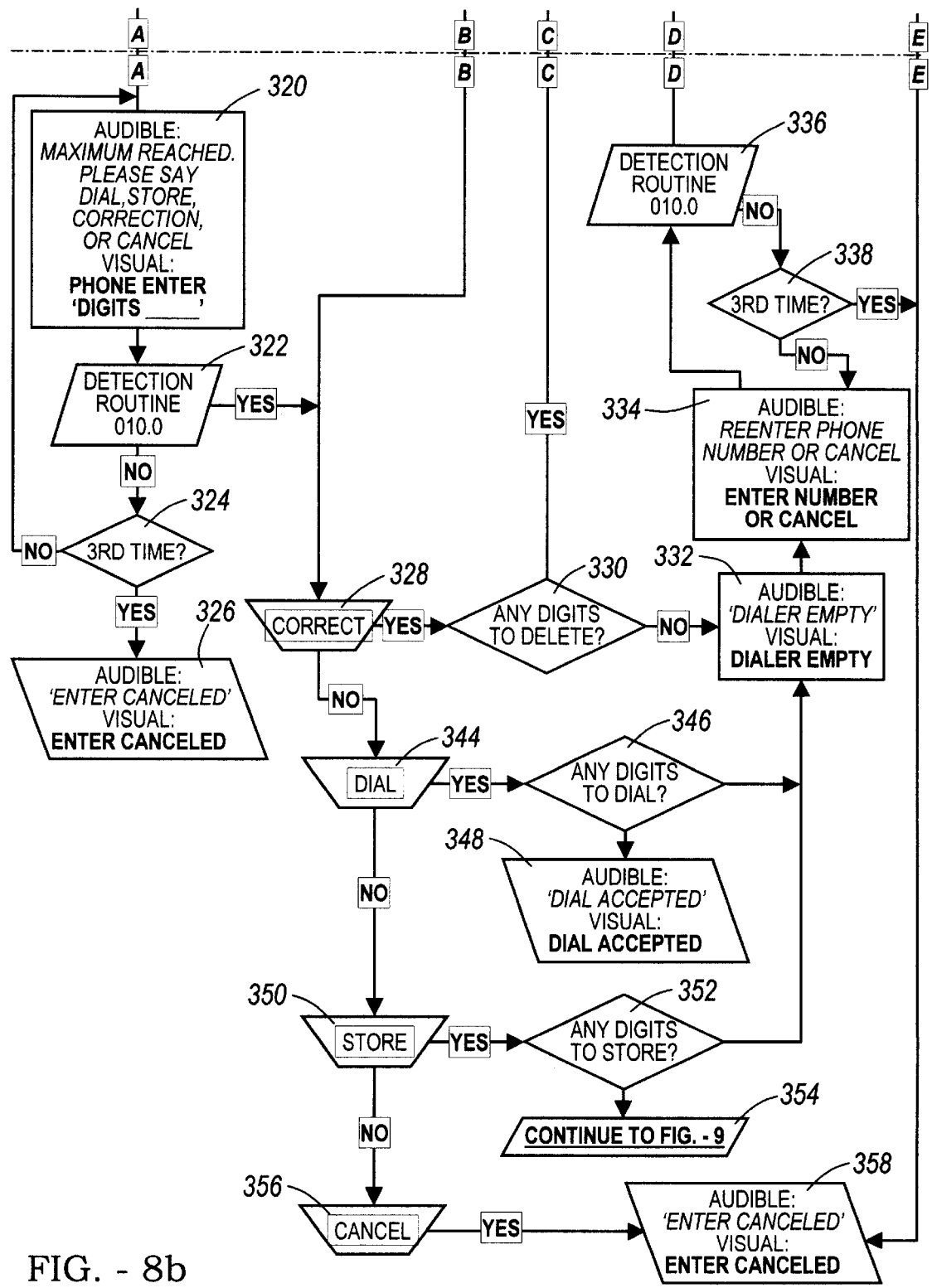
FIG. 8 is a flow chart illustrating a method for entering a phone number into a phone directory using a verbal command, in accordance with the present invention.

Referring now to FIG. 8 a method for verbally entering a phone number into the phone interface is illustrated, in accordance with the present invention. The method is initiated at block 300 where the system has recognized that the phone interface user wishes to enter a phone number. At block 302, the phone interface system repeats the phone number or digits that have been communicated by the user. The system then listens for the next command by the user, as represented by block 304. The user may continue entering digits and then tell the system to dial the phone number, store the phone number, correct the number, or cancel the operation. If the user makes no recognizable response the system states the user's options, as indicated by blocks 306 and 308. If the system has not received a recognizable command from the user after a third request for such a command the system will issue the communication "enter cancelled" and the operation will be cancelled, as represented by blocks 306 and 310.

When the system has detected a recognizable command a recognition result is obtained, at block 312. The recognition result is either a number of digits, a correction command, a dial command, a store command, or a cancel command. If the system has recognized digits, the system will determine whether a maximum number of digits have been reached, such as 32 digits, as represented by blocks 314 and 316. If a maximum number of digits have not been reached the system repeats the digits communicated by the user and waits for additional digits to be entered, as represented by blocks 316, 318, and 304. However, if the maximum number of digits has been reached the system responds with the message "maximum reached, please say dial, correction, store, or cancel", as represented by block 320. At block 322, the system determines whether the user has issued a recognizable command. The system repeats the message "maximum reached, please say dial, correction, store or cancel" three times and then communicates the message "enter cancelled", as represented by block 324 and 326.

When the system has determined that the user has issued the command "correct" the system determines whether there are any digits to correct, as represented by blocks 328 and 330. If there are digits to delete the system states that the digits have been deleted and the process of entering additional digits is repeated, as represented by blocks 330 and 332. If there are no digits to delete the system issues the message "dialer empty" and prompts the user to re-enter the phone number or cancel the operation, as represented by blocks 332 and 334. At block 336, the system waits for a recognizable command. If the system determines that a recognizable command has not been received then the system issues the message "re-enter phone number or cancel", as represented by blocks 338 and 334. When the system has recognized a command by the user the system determines whether the user is canceling the operation or entering additional digits, as represented by blocks 340 and 342.

Alternatively, when the system has determined that the user wishes to dial the phone number entered the system then checks to see whether there are actually any digits to dial, as represented by blocks 344 and 346. If there are no digits to be dialed the system prompts the user to enter more digits or cancel as previously described, as represented by block 346. When there are digits to dial then the system automatically dials those digits and issues the response "dial accepted", as represented by block 348.

When the system has determined that the user has issued the command "store" the system determines whether there are any digits to store, as represented by blocks 350 and 352. If there aren't any digits to store the system communicates this to the user and asks the user to enter more digits or cancel. When there are more digits to store the system enters a phone number store routine, as represented by blocks 352 and 354. The phone number store routine will be described hereinafter with reference to FIG. 9.

When the system determines that the user has issued a "cancel" command the system issues the message "enter cancelled" and cancels the operation, as represented by blocks 356 and 358.

Figure 9A:
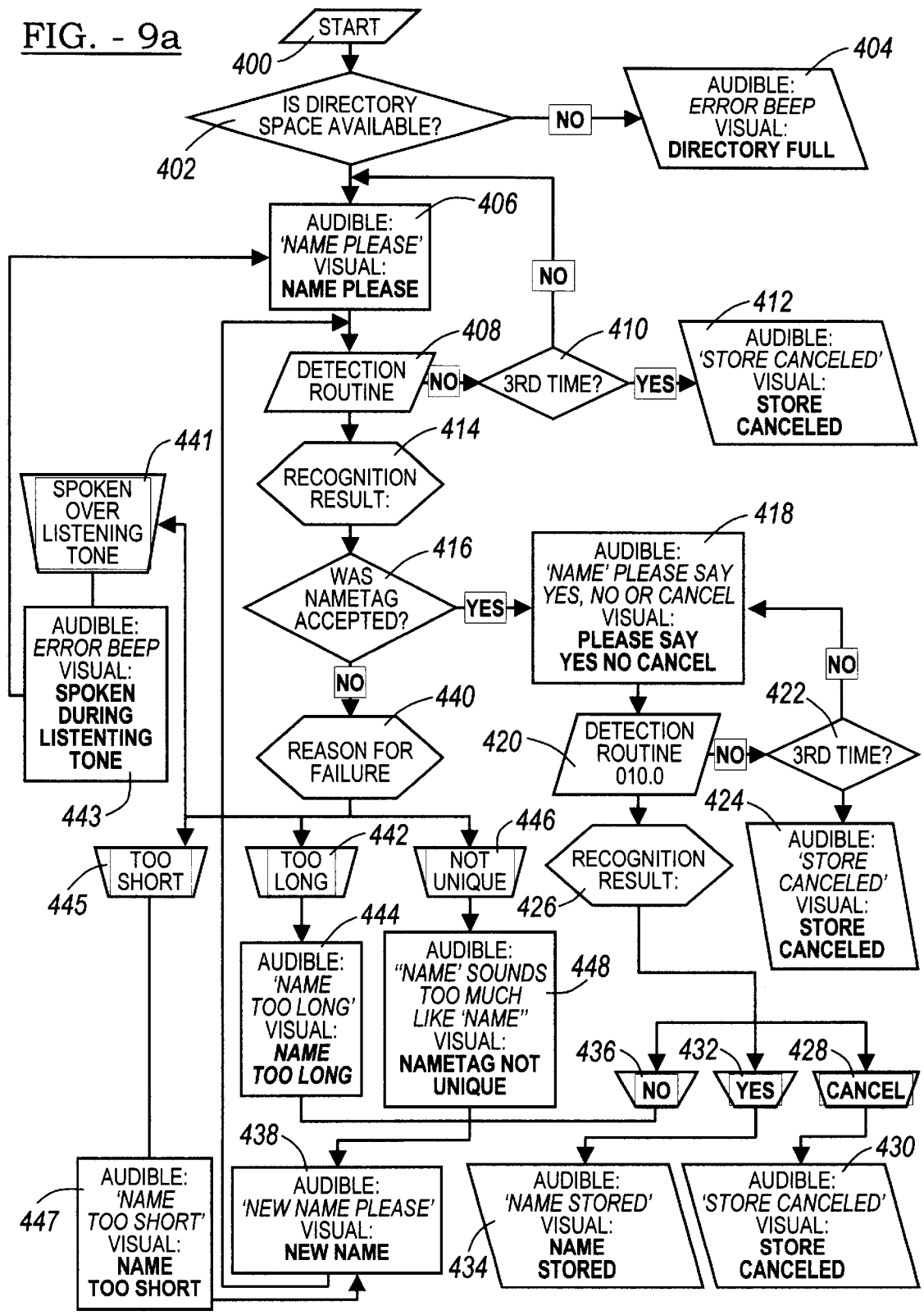
FIG. 9 is a flow chart illustrating a method for storing a nametag by using a verbal command, in accordance with the present invention.

Referring now to FIG. 9 a method for storing a phone number in a phone interface directory is illustrated, in accordance with the present invention. This routine may be initiated by the user through the enter phone number routine as described above (with reference to FIG. 8) or directly by saying the command "store" and then the number to be stored. The method starts at block 400 where the system has determined that a user wishes to store a number. At block 402, the system determines whether a directory memory space is available to store the phone number. If the directory is full then the system issues an "error beep", as represented by block 404. If space is available in the directory the system asks the user for a "name", as represented by block 406. The system waits for the user to communicate a "name" if the system does not receive a recognizable response the system repeats the message "name please", as represented by blocks 408 and 410. After the system has asked three times that the user enter a "name" the system issues the message "store cancelled", as represented by blocks 410 and 412.

When a recognizable response is received by the system a recognition result is obtained, as represented by block 414. At block 416 the system determines whether the "name" or nametag received by the user is acceptable. If the nametag is acceptable the system repeats the "name" and asks the user to accept the "name" by saying "yes" or "no" or asks whether the user would like to cancel the operation, as represented by block 418. The system then waits for a recognizable response from the user and if a response is not received, the message is repeated, as represented by blocks 418, 420 and 422. If after three times of prompting the user, no response from the user is received, the system issues the message "store cancelled", as represented by blocks 422 and 424.

When the system does receive a recognizable command a recognition result is determined, as represented by block 426. If the recognition result is that the user would like to cancel the system issues the message "store cancelled", as represented by blocks 428 and 430. Alternatively, if the recognition result is that the user accepts the name the system will issue the message "name stored" (thus repeating the actual name articulated by the user), as represented by blocks 432 and 434. If the recognition result is that the user wishes to not accept the name then the system issues the message "new name please", as represented by blocks 436 and 438.

Preferably, when the system has determined that a nametag is not acceptable the system then determines the reason for the failure, as represented by block 440. If the system has determined that the failure occurred because the name was too long the system issues the message "name too long" followed by the message "new name please" and then waits for the user to enter a new name, as represented by blocks 442, 444, and 438. Preferably, a name is too long if the user takes more than 4.5 seconds to say the name, but of course this amount of time is adjustable. However, if the system has determined that the reason for the failure is that the name is not unique because it is exactly like or sounds like another name in the directory then the system issues the message "name sounds too much like" and the name it sounds like followed by the message "new name please", as represented by blocks 446, 448, and 438. Additionally, if the system determines that the user's response contains confusing words or grammar such as system commands, phone numbers, etc. the system will ask the user to provide a new name.

Further, if the system has determined that the failure occurred because the name was too short the system issues the message "name too short" followed by the message "new name please" and then waits for the user to enter a new name, as represented by blocks 445, 447, and 438. A name is too short if it can be confused with audio noise, or noise produced by the road, or other unrecognizable utterances, such as "yah", "ugh", etc. However, if the system has determined that the reason for the failure is that the user's response has been spoken over the listening tone then the system issues an "error beep" followed by the message "new name please", as represented by blocks 441, 443, and 406.

Figure 10:
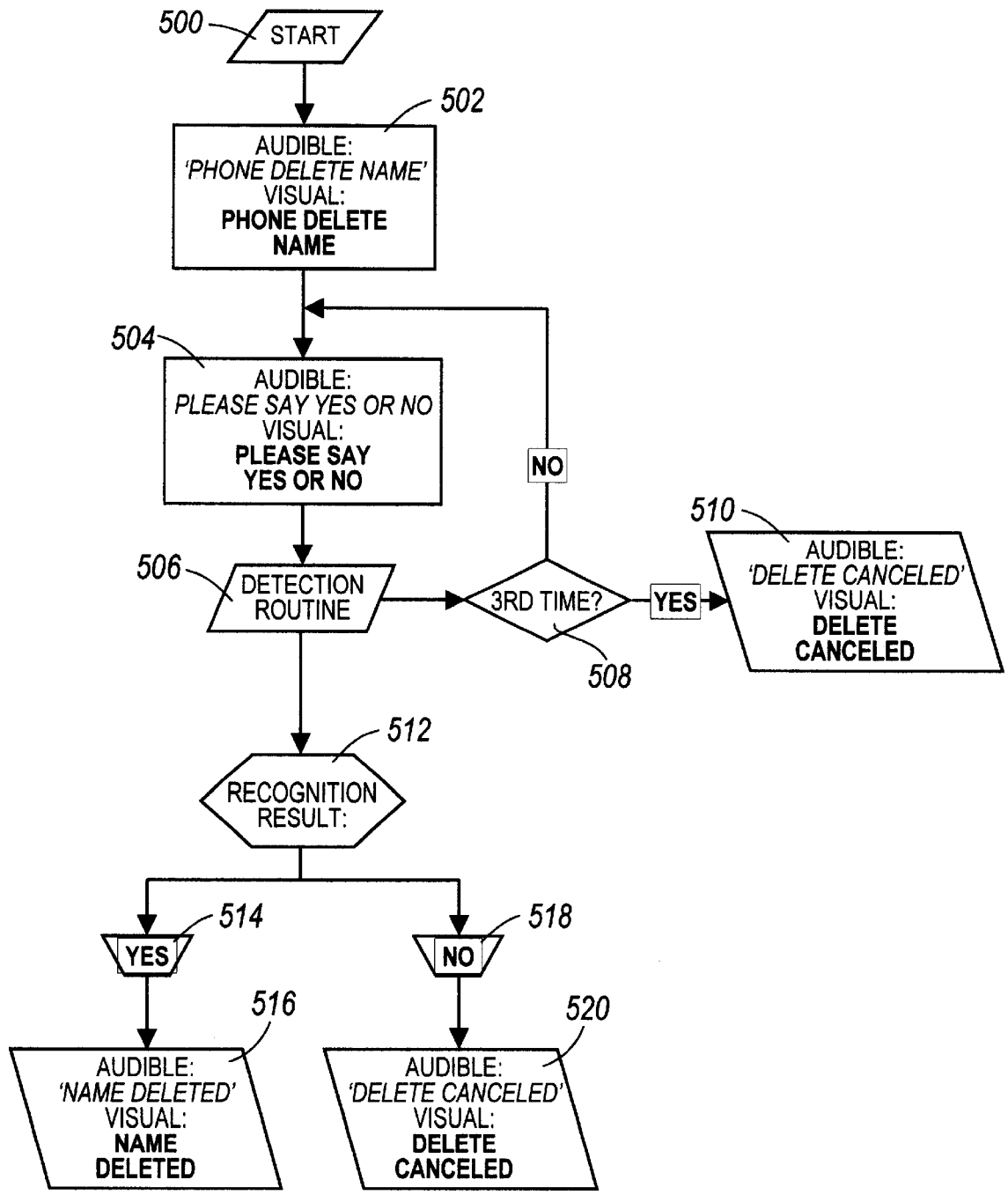
FIG. 10 is a flow chart illustrating a method for deleting a name from a phone directory using a verbal command, in accordance with the present invention.

Referring now to FIG. 10, a method for deleting a record or a name in a phone interface directory is illustrated, in accordance with the present invention. The method is initiated at block 500 wherein the phone interface system has determined that a phone interface user wishes to delete a name in the phone directory. At block 502 the system response with the message "phone delete name" (using the actual name spoken by the user), indicating to the user what the system has recognized. At block 504 the system asks the user to say "yes" or "no" for confirming that the user wishes to delete the name. The system then waits for the user to respond and if the system does not receive a recognizable command the message "please say yes or no" will be repeated, as represented by blocks 506 and 508. Not until the system has prompted the user to respond for the third time will 'the system issue the command "delete cancelled", as represented by blocks 506, 508, and 510.

However, when the system detects a recognizable command a recognition result is determined at block 512. If the system has determined that the user has responded affirmatively then the system issues the message "name deleted", as represented by blocks 514 and 516. Alternatively, if the system has determined that the user has responded in the negative then the system will issue the message "delete cancelled", as represented by blocks 518 and 520.

Figure 11:
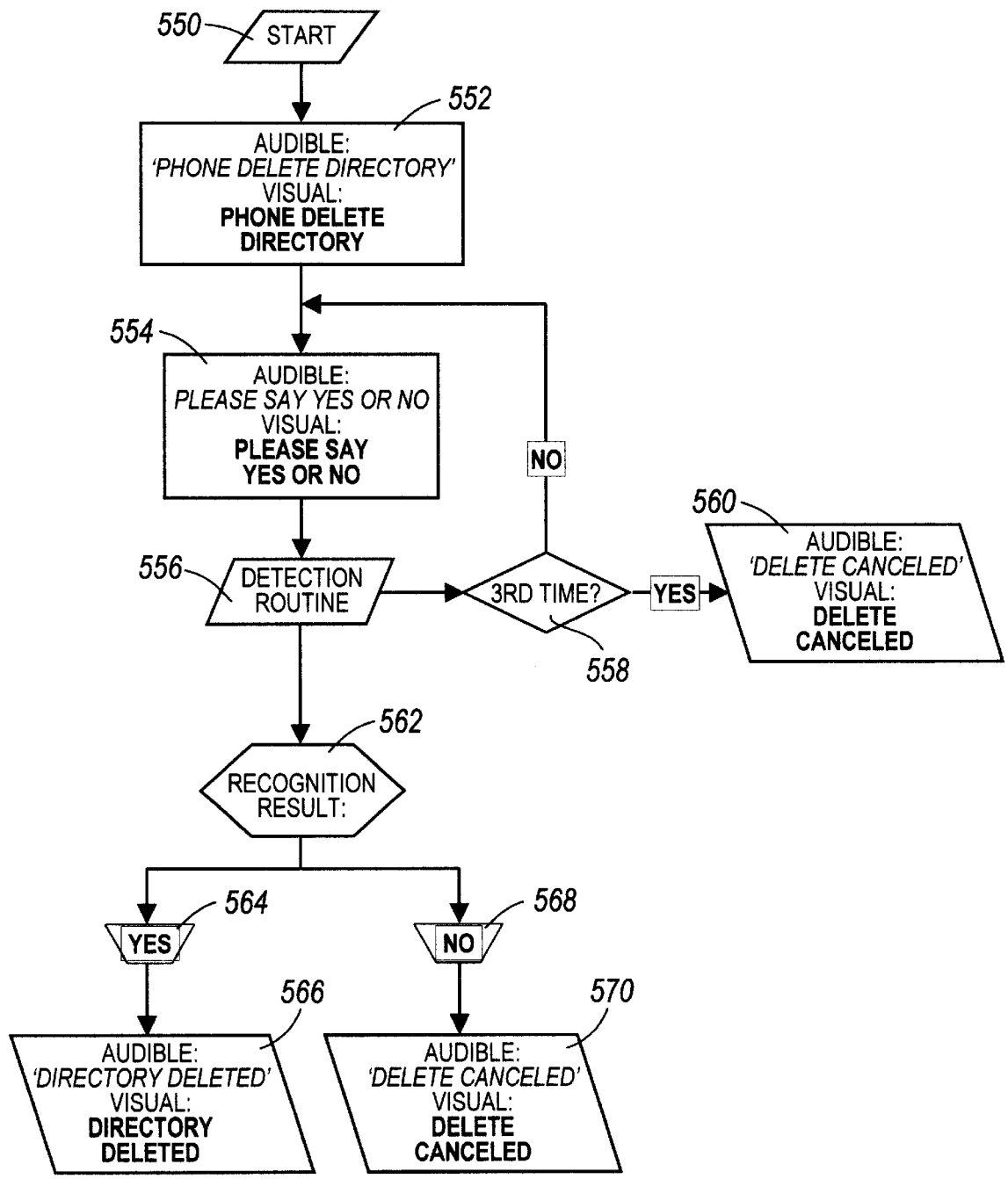
FIG. 11 is a flow chart illustrating a method for deleting a phone directory using a verbal command, in accordance with the present invention.

Referring now to FIG. 11, a method for deleting the directory of a phone interface system is illustrated, in accordance with the present invention. The method is initiated at block 550 where the system has determined that a user wishes to delete the phone directory. At block 552 the system issues the message "phone delete directory". At block 554, the system asks the user to respond "yes" or "no". The detection routine is initiated at block 556 and the message "please say yes or no" is repeated three times, as represented by block 358. After the third time the system issues the message "delete cancelled", as represented by block 560.

However, if the system had detected a recognizable command a recognition result is determined at block 562. When the system has recognized that the user has answered in the affirmative the system then issues the message. "directory deleted", as represented by blocks 564 and 556. If the system has determined that the user has answered in the negative the system issues the message "delete cancelled", as represented by blocks 568 and 570.

Figure 12:
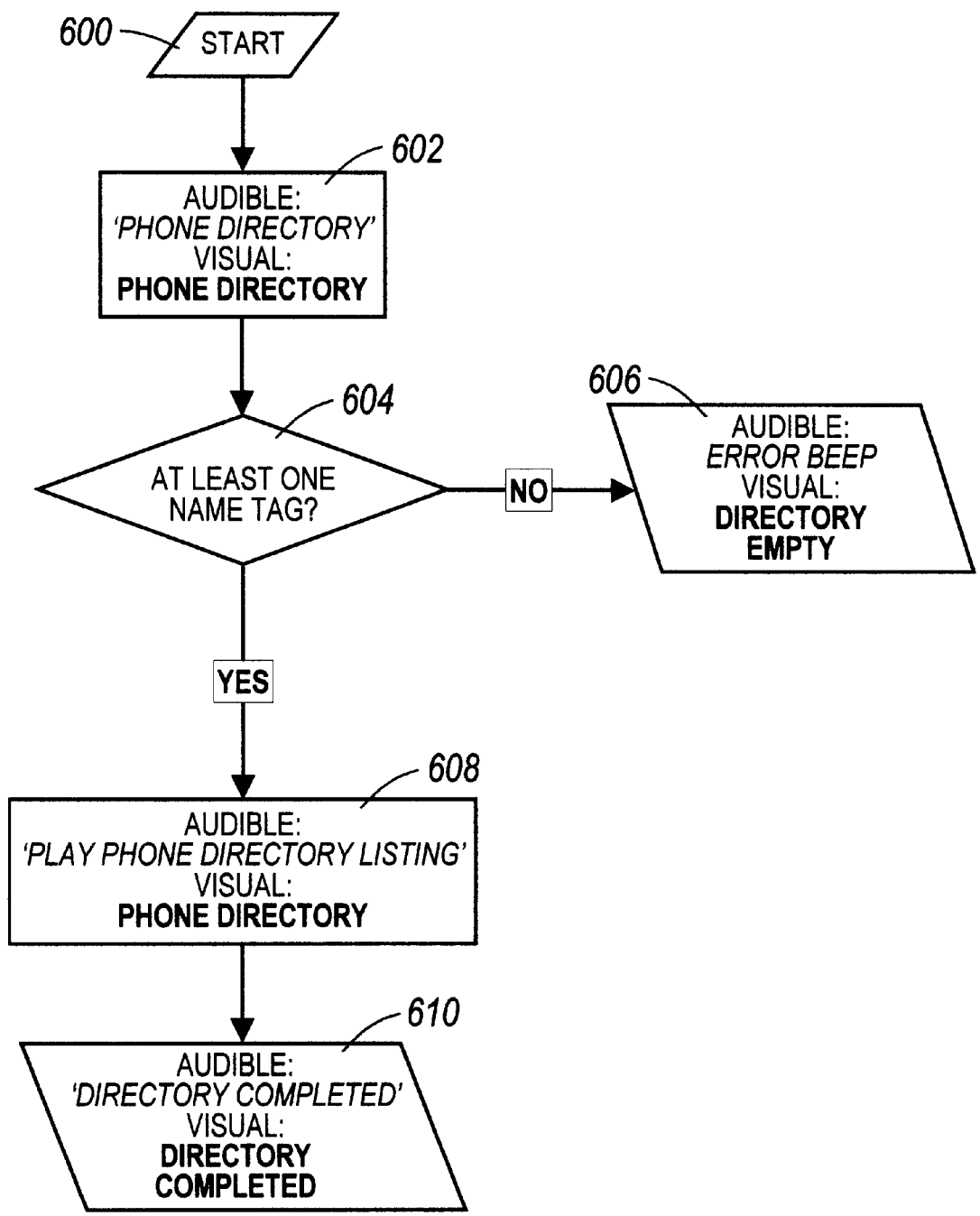
FIG. 12 is a flow chart illustrating a method for accessing a phone directory using a verbal command, in accordance with the present invention.

Referring now to FIG. 12 a method for listing entries in a phone directory of a phone interface is illustrated, in accordance with the present invention. The method is initiated at block 600 wherein the system has determined that a user wishes to hear all of the entries present in a phone directory. At block 602 the system responds to the command issued by the user by broadcasting the message "phone directory". If there is not at least one name or entry in the phone directory the system will issue an "error beep", represented by blocks 604 and 606. If there is at least one entry in the phone directory the system plays the entire listing of entries in the phone directory, as represented by block 608. When the system has finished playing all of the entries in the phone directory the message "directory completed" is issued, as represented by block 610.

Figure 13:
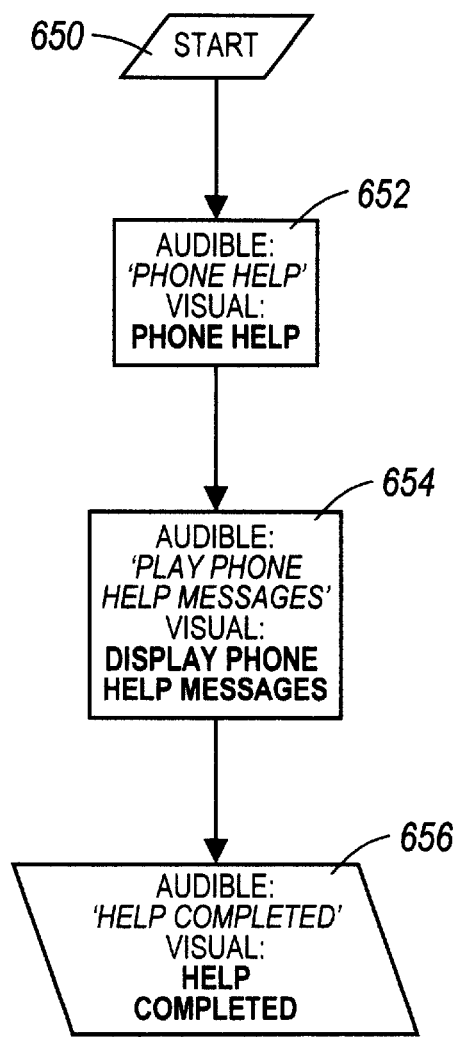
FIG. 13 is a flow chart illustrating a method for accessing a phone help function using a verbal command, in accordance with the present invention.

Referring now to FIG. 13 a method for entering a phone help function of a phone interface is illustrated, in accordance with the present invention. The method is initiated at block 650 wherein the system has determined that a user wishes to enter "phone help". At block 652 the system issues the message "phone help" and then at block 654 broadcasts all of the usable commands and all the help messages. After all of the help messages have been issued the system broadcasts the message that help is completed, as represented by block 656.

Figure 14:
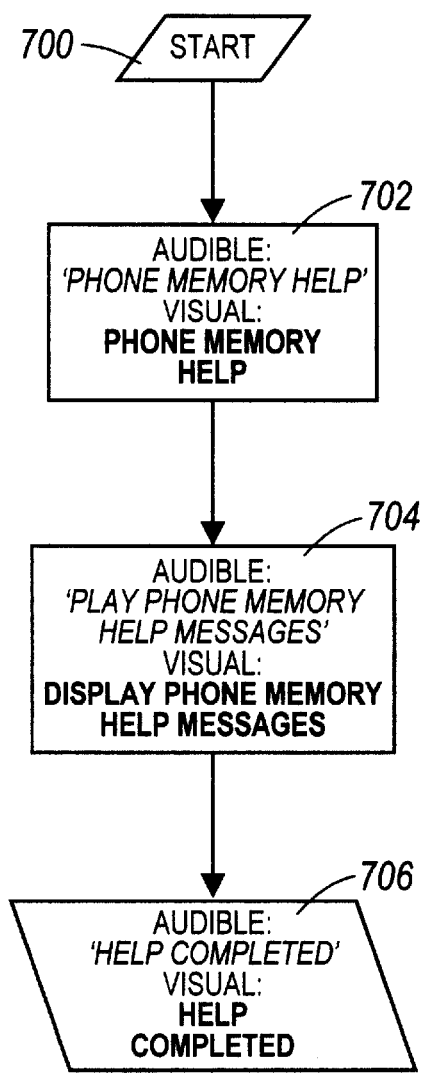
FIG. 14 is a flow chart illustrating a method for accessing a phone memory help function using a verbal command, in accordance with the present invention.

Referring now to FIG. 14 a method for entering a phone memory help feature of a phone interface is illustrated, in accordance with the present invention. The method is initiated at block 700 after the system has determined that a user wishes to enter the phone memory help feature only. In recognition that the phone interface system understands that the user wishes to enter the phone help feature the system issues the message "phone memory help", as represented by block 702. All of the phone memory help messages are then played, as represented by block 704. At block 706 the system issues the message "help completed" after all the memory help messages have been broadcast.

A further feature of the present invention is that the system accepts/recognizes all of the single digits (one through nine), plus the frequently grouped three digits (800, 900, etc.), double, treble/triple (as in treble zero), pound, star, and hash as valid responses from system users.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

What is claimed is:

1. A method for controlling a phone system having speech recognition capabilities, the method comprising:
    entering a phone number into the phone system using a first voice command;
    dialing the phone number using a second voice command;
    associating the phone number with a tag using a third voice command; and
    storing the tag into a phone directory of the phone system using a fourth voice command if the tag is determined to be less than a predefined threshold length, and wherein the phone system repeats the voice commands after the system receives each of the commands.

2. The method of claim 1 wherein entering the phone number further comprises articulating a memory number associated with the phone number.

3. The method of claim 1 wherein entering the phone number further comprises articulating a tag associated with the phone number.

4. The method of claim 1 wherein determining whether the tag is too long further comprises rejecting the tag if the tag is too long.

5. The method of claim 1 further comprising confirming the articulated voice command.

6. The method of claim 5 wherein confirming the articulated voice command further comprises requesting a system user to acknowledge a system message.

7. The method of claim 1 wherein storing the tag further comprises determining whether the tag is unique as compared to other tags stored in the phone directory.

8. The method of claim 7 wherein determining whether the tag is unique further comprises rejecting the tag if the tag is not unique as compared with other tags stored in the phone directory.

9. The method of claim 7 wherein determining whether the tag is unique further comprises determining whether the tag sounds like other tags stored in the phone directory.

10. The method of claim 9 wherein determining whether the tag is unique further comprises rejecting the tag if the tag sounds like other tags stored in the phone directory.

11. A computer readable storage medium having instructions stored thereon that are executable by a controller to perform a method of controlling a phone system having speech recognition capabilities, the controller is in communication with a phone system actuator, a microphone, a speaker and a phone, the medium further comprising:
   instructions for entering a phone number into a phone system using a first voice command;
   instructions for dialing the phone number using a second voice command;
   instructions for associating the phone number with a tag using a third voice command; and
   instructions for storing the tag into the phone directory using a fourth voice command if the tag is determined to be less than a predefined threshold length, and wherein the phone system repeats the voice commands after the system receives each of the commands.

12. The medium of claim 11 wherein instructions for entering the phone number further comprises instructions for receiving a memory number associated with the phone number.

13. The medium of claim 11 wherein instructions for entering the phone number further comprises instructions for receiving a tag associated with the phone number.

14. The medium of claim 11 wherein instructions for determining whether the tag is less than a predefined threshold length further comprises instructions for rejecting the tag if the tag is too long.

15. The medium of claim 12 further comprising instructions for confirming the articulated voice command.

16. The medium of claim 15 wherein instructions for confirming the articulated voice command further comprises instructions for requesting a system user to acknowledge a system message.

17. The medium of claim 12 wherein instructions for storing the tag further comprises instructions for determining whether the tag is unique as compared to other tags stored in the phone directory.

18. The medium of claim 17 wherein instructions for determining whether the tag is unique further comprises instructions for rejecting the tag if the tag is not unique as compared with other tags stored in the phone directory.

19. The medium of claim 18 wherein instructions for determining whether the tag is unique further comprises instructions for determining whether the tag sounds like other tags stored in the phone directory.

20. The medium of claim 19 wherein instructions for determining whether the tag is unique further comprises instructions for rejecting the tag if the tag sounds like other tags stored in the phone directory.

* * * * *